US012770880B2

(12) United States Patent
Mizukoshi et al.

(10) Patent No.: US 12,770,880 B2
(45) Date of Patent: Oct. 20, 2026

(54) NON-AQUEOUS ELECTROLYTE SECONDARY BATTERY

(71) Applicant: Panasonic Energy Co., Ltd., Moriguchi (JP)

(72) Inventors: Fumikazu Mizukoshi, Osaka (JP); Nobuhiro Sakitani, Osaka (JP)

(73) Assignee: PANASONIC ENERGY CO., LTD., Osaka (JP)

( * ) Notice: Subject to any disclaimer, the term of this patent is extended or adjusted under 35 U.S.C. 154(b) by 576 days.

(21) Appl. No.: 18/273,186

(22) PCT Filed: Jan. 25, 2022

(86) PCT No.: PCT/JP2022/002566
§ 371 (c)(1),
(2) Date: Jul. 19, 2023

(87) PCT Pub. No.: WO2022/163618
PCT Pub. Date: Aug. 4, 2022

(65) Prior Publication Data

US 2024/0088390 A1 Mar. 14, 2024

(30) Foreign Application Priority Data

Jan. 29, 2021 (JP) ................................ 2021-013603

(51) Int. Cl.
*H01M 4/62* (2006.01)
*H01M 4/02* (2006.01)
(Continued)

(52) U.S. Cl.
CPC ............. *H01M 4/62* (2013.01); *H01M 4/133* (2013.01); *H01M 4/134* (2013.01); *H01M 4/364* (2013.01);
(Continued)

(58) Field of Classification Search
CPC ........ H01M 4/62; H01M 4/133; H01M 4/134; H01M 4/364; H01M 4/483; H01M 4/583;
(Continued)

(56) References Cited

U.S. PATENT DOCUMENTS

2008/0131781 A1 6/2008 Yong et al.
2008/0241698 A1 10/2008 Katoh
2017/0084910 A1* 3/2017 Ichikawa .............. H01M 4/625

FOREIGN PATENT DOCUMENTS

JP 2003-308878 A 10/2003
JP 2007-527603 A 9/2007
(Continued)

OTHER PUBLICATIONS

English translation of JP2013175345A (Year: 2013).*
(Continued)

*Primary Examiner* — Ula C Ruddock
*Assistant Examiner* — Sarika Gupta
(74) *Attorney, Agent, or Firm* — WHDA, LLP

(57) ABSTRACT

A non-aqueous electrolyte secondary battery according to an aspect of the present disclosure comprises: an electrode body in which a belt-shaped positive electrode and a belt-shaped negative electrode are wound with a separator therebetween; an electrolyte; and an outer case which accommodates the electrode body and the electrolyte. The negative electrode has a negative electrode current collector and a negative electrode mixture layer which is formed on a surface of the negative electrode current collector and which contains a negative electrode active material and a solid electrolyte. The negative electrode mixture layer has a region in which the solid electrolyte content in the inner winding end part is higher than the solid electrolyte content in the outer winding end part, and the solid electrolyte
(Continued)

content continuously decreases from the inner winding end part side to the outer winding end part side.

4 Claims, 4 Drawing Sheets

(51) Int. Cl.

| | |
|---|---|
| ***H01M 4/133*** | (2010.01) |
| ***H01M 4/134*** | (2010.01) |
| ***H01M 4/36*** | (2006.01) |
| ***H01M 4/48*** | (2010.01) |
| ***H01M 4/583*** | (2010.01) |
| ***H01M 10/0562*** | (2010.01) |
| ***H01M 10/0587*** | (2010.01) |

(52) U.S. Cl.
CPC ........... *H01M 4/483* (2013.01); *H01M 4/583* (2013.01); *H01M 10/0562* (2013.01); *H01M 10/0587* (2013.01); *H01M 2004/027* (2013.01); *H01M 2300/0071* (2013.01)

(58) Field of Classification Search
CPC ......... H01M 10/0562; H01M 10/0587; H01M 2004/027; H01M 2300/0071; H01M 4/386; H01M 4/587; H01M 10/052; H01M 10/0525; H01M 4/13; Y02E 60/10; Y02P 70/50
See application file for complete search history.

(56) References Cited

FOREIGN PATENT DOCUMENTS

| | | | | |
|---|---|---|---|---|
| JP | 2008-117542 | A | | 5/2008 |
| JP | 2009-158335 | A | | 7/2009 |
| JP | 2011-044252 | A | | 3/2011 |
| JP | 2013175345 | A | * | 9/2013 |
| JP | 2015-095412 | A | | 5/2015 |
| JP | 2017-139107 | A | | 8/2017 |

OTHER PUBLICATIONS

International Search Report dated Mar. 22, 2022, issued in counterpart Inernational Application No. PCT/JP2022/002566 (4 pages).

* cited by examiner

Figure 4（a）
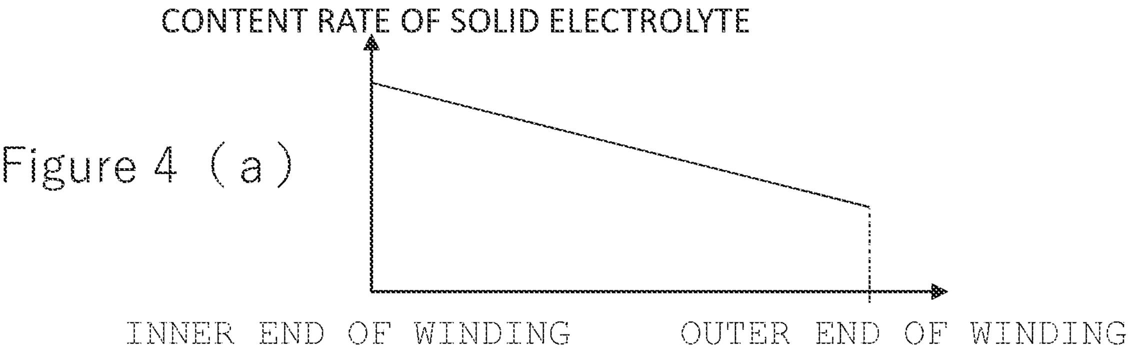
Figure 4（b）
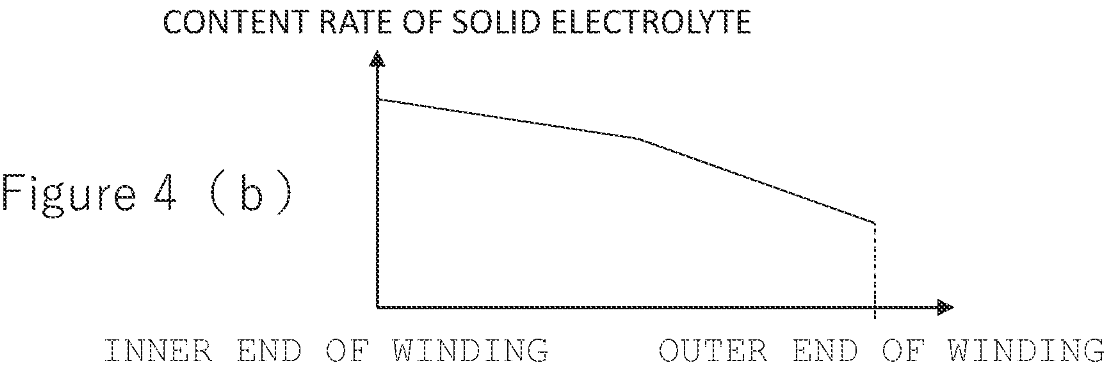
Figure 4（c）
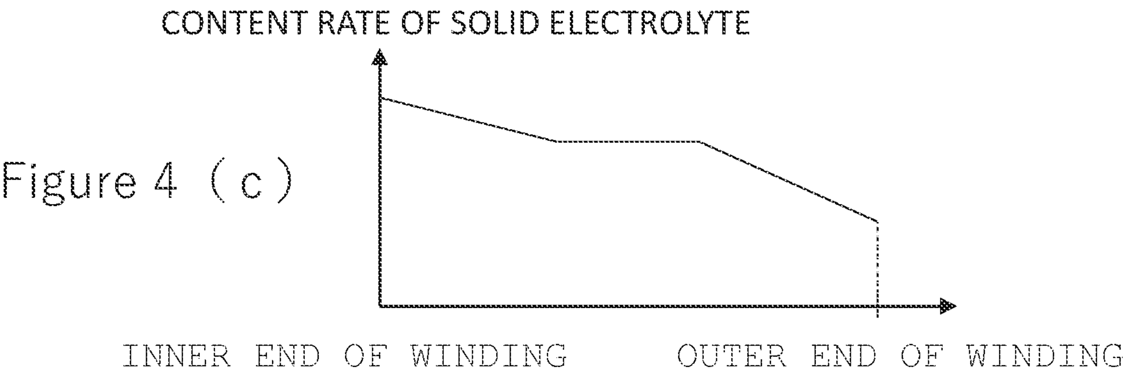
Figure 4（d）
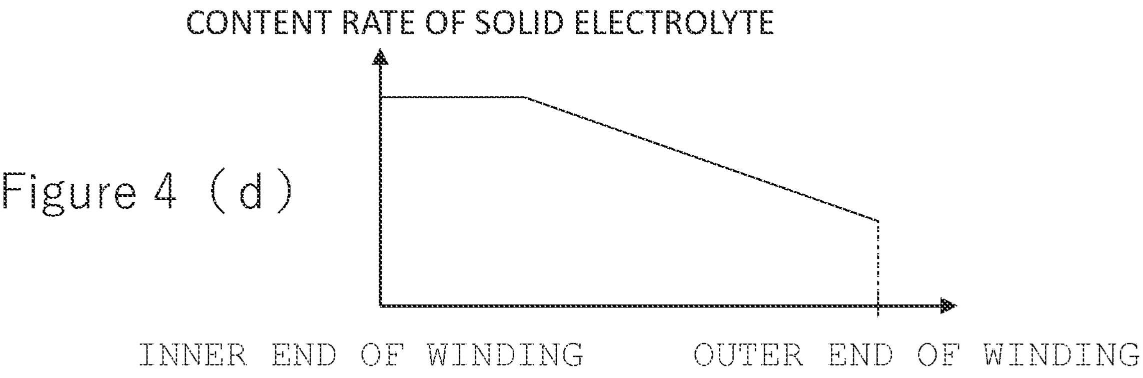

NON-AQUEOUS ELECTROLYTE SECONDARY BATTERY

CROSS REFERENCE TO RELATED APPLICATIONS

This Application is the National Stage of International Application No. PCT/JP2022/002566, filed on Jan. 25, 2022, which claims priority from Application No. 2021-013603 filed on Jan. 29, 2021 in Japan. The entire contents of these applications are incorporated herein by reference in their entirety.

TECHNICAL FIELD

The present disclosure generally relates to a non-aqueous electrolyte secondary battery.

BACKGROUND ART

A positive electrode and negative electrode of a non-aqueous electrolyte secondary battery each has a current collector and a mixture layer formed on a surface of the current corrector. The mixture layer includes an active material that may reversibly occlude and release Li ions. Patent Literature 1 to 3 disclose art of containing an inorganic solid electrolyte having Li-ion conductivity in the mixture layer for a purpose of achievement of both of improving safety and maintaining performance of a battery.

CITATION LIST

Patent Literature

PATENT LITERATURE 1: Japanese Unexamined Patent Application Publication No. 2007-527603

PATENT LITERATURE 2: Japanese Unexamined Patent Application Publication No. 2008-117542

PATENT LITERATURE 3: Japanese Unexamined Patent Application Publication No. 2011-44252

SUMMARY

Technical Problem

In a non-aqueous electrolyte secondary battery having a wound electrode assembly, the electrode assembly expanding and contracting with charge and discharge causes ununiformed distribution of an electrolyte liquid in the electrode assembly, and a battery capacity may be deteriorated by repeated charge and discharge. The art disclosed in Patent Literature 1 does not investigate the distribution of the electrolyte liquid in the electrode assembly, and still has a room for improvement of the charge-discharge cycle characteristics.

It is an advantage of the present disclosure to provide a non-aqueous electrolyte secondary battery with improved charge-discharge cycle characteristics.

Solution to Problem

A non-aqueous electrolyte secondary battery of an aspect of the present disclosure comprises: an electrode assembly in which a band-shaped positive electrode and a band-shaped negative electrode are wound with a separator interposed therebetween; an electrolyte liquid; and an exterior housing the electrode assembly and the electrolyte liquid, wherein the negative electrode has: a negative electrode current collector; and a negative electrode mixture layer formed on a surface of the negative electrode current collector and including a negative electrode active material and a solid electrolyte, and in the negative electrode mixture layer, a content rate of the solid electrolyte in an inner end of winding is higher than a content rate of the solid electrolyte in an outer end of winding, and the negative electrode mixture layer has a region where a content rate of the solid electrolyte continuously decreases from a side of the inner end of winding to a side of the outer end of winding.

Advantageous Effect of Invention

According to the secondary battery of an aspect of the present disclosure, the charge-discharge cycle characteristics may be improved.

BRIEF DESCRIPTION OF DRAWINGS

FIGS. 4(*a*) to 4(*d*) are graphs indicating a change in a content rate of a solid electrolyte included in a negative electrode mixture layer in a longitudinal direction of FIG. 3.

DESCRIPTION OF EMBODIMENTS

Hereinafter, an example of an embodiment of a cylindrical secondary battery according to the present disclosure will be described in detail with reference to the Drawings. In the following description, specific shapes, materials, values, directions, and the like, which are examples for facilitating understanding of the present invention, may be appropriately modified with specifications of cylindrical secondary batteries. When a plurality of embodiments and modified examples are included in the following description, use in appropriate combination of characteristic portions thereof are anticipated in advance.

Figure 1:
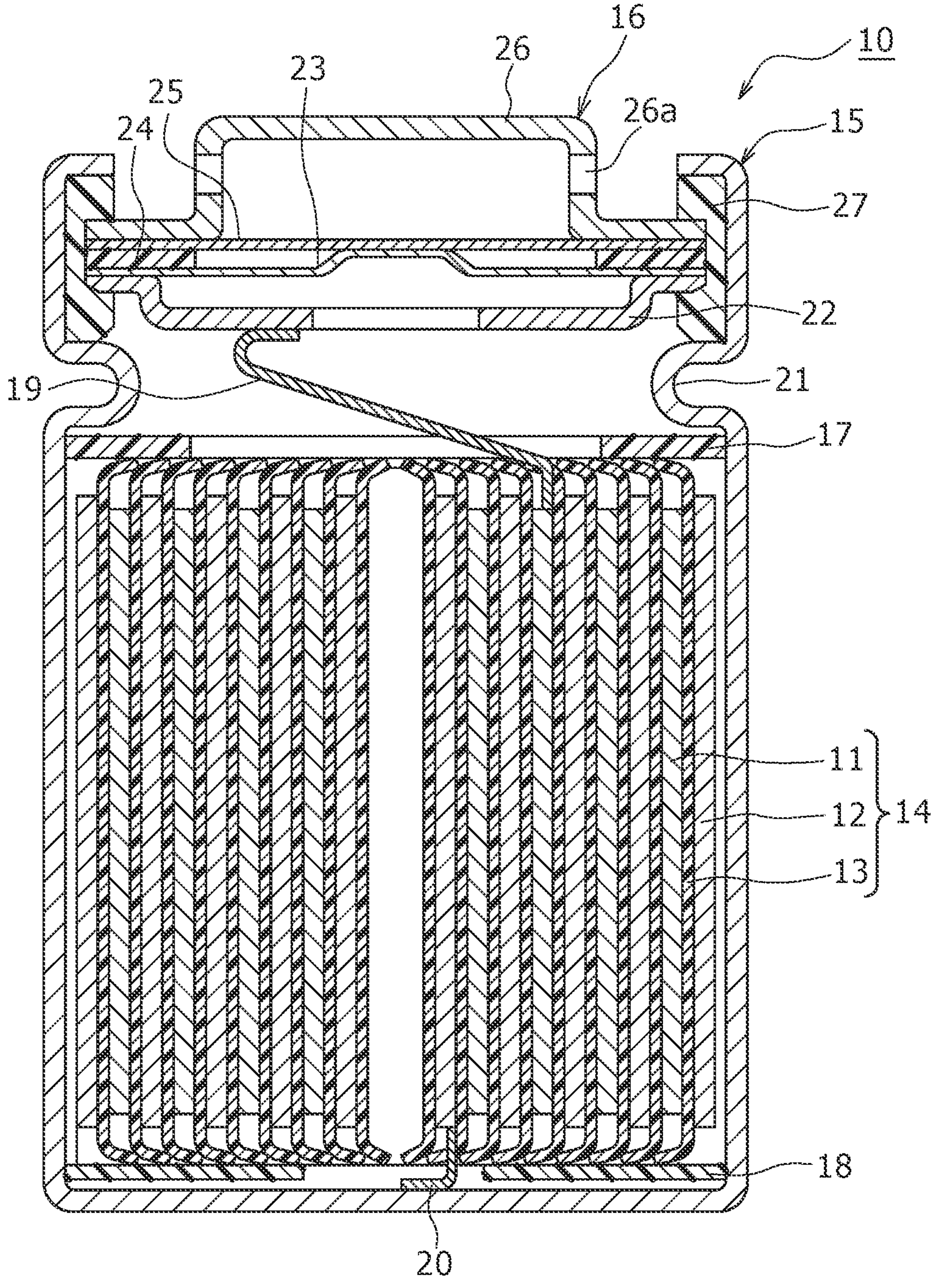
FIG. 1 is an axial sectional view of a cylindrical secondary battery of an example of an embodiment.

FIG. 1 is an axial sectional view of a cylindrical secondary battery 10 of an example of an embodiment. In the secondary battery 10 illustrated in FIG. 1, an electrode assembly 14 and an electrolyte liquid (not illustrated) are housed in an exterior 15. The electrode assembly 14 has a wound structure in which a band-shaped positive electrode 11 and a band-shaped negative electrode 12 are wound with a separator 13 interposed therebetween. For a non-aqueous solvent in the electrolyte liquid (organic solvent), carbonates, lactones, ethers, ketones, esters, and the like may be used, and two or more of these solvents may be mixed to use. When two or more of the solvents are mixed to use, a mixed solvent including a cyclic carbonate and a chain carbonate is preferably used. For example, ethylene carbonate (EC), propylene carbonate (PC), butylene carbonate (BC), and the like may be used as the cyclic carbonate, and dimethyl carbonate (DMC), ethyl methyl carbonate (EMC), diethyl carbonate (DEC), and the like may be used as the chain carbonate. For an electrolyte salt in the electrolyte liquid, $LiPF_6$, $LiBF_4$, $LiCF_3SO_3$, and the like, and a mixture thereof may be used. An amount of the electrolyte salt dissolved in the non-aqueous solvent may be, for example, greater than or equal to 0.5 mol/L and less than or equal to 2.0 mol/L. Hereinafter, for convenience of description, a sealing assembly 16 side will be described as "the upper side", and the bottom side of the exterior 15 will be described as "the lower side".

An opening end of the exterior 15 is capped with the sealing assembly 16 to seal inside the secondary battery 10. Insulating plates 17 and 18 are provided on the upper and lower sides of the electrode assembly 14, respectively. A positive electrode lead 19 extends upward through a through hole of the insulating plate 17, and welded with the lower face of a filter 22, which is a bottom plate of the sealing assembly 16. In the secondary battery 10, a cap 26, which is a top plate of the sealing assembly 16 electrically connected to the filter 22, becomes a positive electrode terminal. Meanwhile, a negative electrode lead 20 extends through a through hole of the insulating plate 18 toward the bottom side of the exterior 15, and welded with a bottom inner face of the exterior 15. In the secondary battery 10, the exterior 15 becomes a negative electrode terminal. When the negative electrode lead 20 is provided on the outer end of winding, the negative electrode lead 20 extends through an outside of the insulating plate 18 toward the bottom side of the exterior 15, and welded with the bottom inner face of the exterior 15.

The exterior 15 is, for example, a bottomed cylindrical metallic exterior housing can. A gasket 27 is provided between the exterior 15 and the sealing assembly 16 to achieve sealability inside the secondary battery 10. The exterior 15 has a grooved portion 21 formed by, for example, pressing the side wall thereof from the outside to support the sealing assembly 16. The grooved portion 21 is preferably formed circularly along the circumferential direction of the exterior 15, and supports the sealing assembly 16 with the upper face thereof.

The sealing assembly 16 has a stacked structure of a filter 22, a lower vent member 23, an insulating member 24, an upper vent member 25, and a cap 26 in this order from the electrode assembly 14 side. Each member constituting the sealing assembly 16 has, for example, a disk shape or a ring shape, and each member except for the insulating member 24 is electrically connected to each other. The lower vent member 23 and the upper vent member 25 are connected to each other at each of centers thereof, and the insulating member 24 is interposed between each of the circumferences thereof. If the internal pressure of the battery increases due to abnormal heat generation, for example, the lower vent member 23 breaks and thus the upper vent member 25 expands toward the cap 26 side to be separated from the lower vent member 23, resulting in cutting off of an electrical connection between both the members. If the internal pressure further increases, the upper vent member 25 breaks, and gas is discharged through an opening 26*a* of the cap 26.

Figure 2:
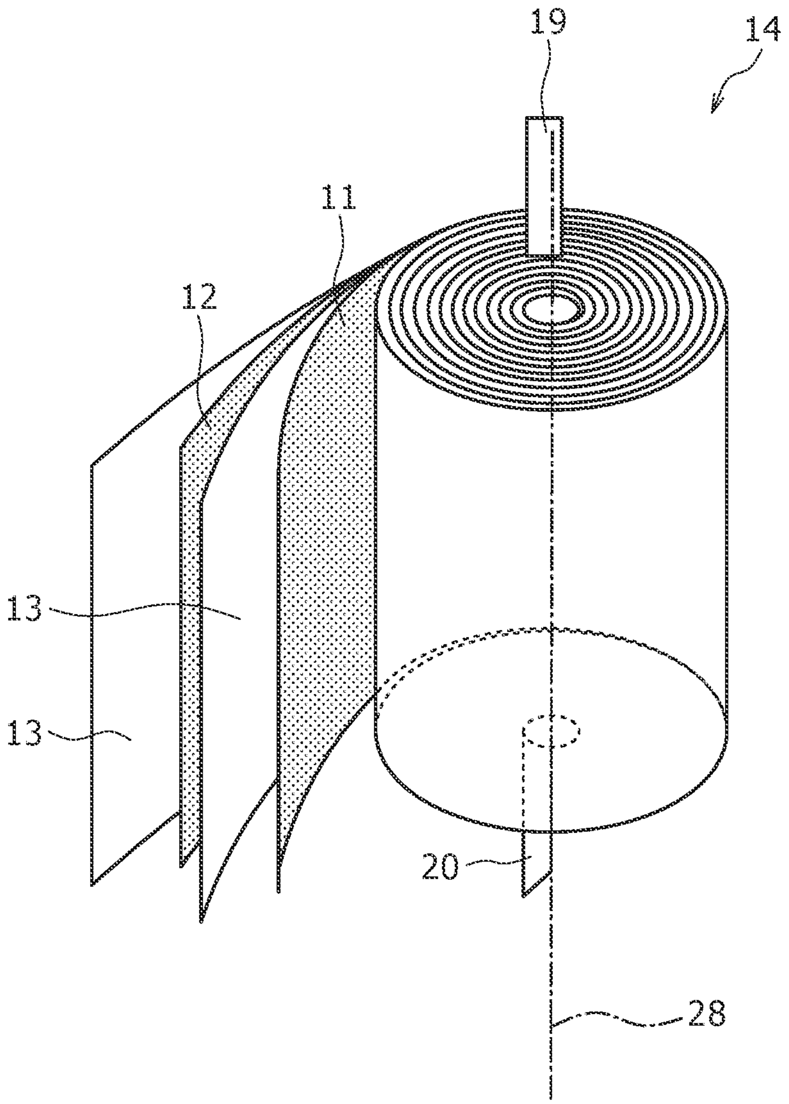
FIG. 2 is a perspective view of a wound electrode assembly comprised in the secondary battery illustrated in FIG. 1.

Next, the electrode assembly 14 will be described with reference to FIG. 2. FIG. 2 is a perspective view of the electrode assembly 14. As described above, the electrode assembly 14 has a wound structure in which the positive electrode 11 and the negative electrode 12 are spirally wound with the separator 13 interposed therebetween. All of the positive electrode 11, the negative electrode 12, and the separator 13 are formed in a band shaped, and spirally wound around a winding core disposed along a winding axis 28 to be alternately stacked in the radial direction of the electrode assembly 14. In the radial direction, the winding axis 28 side is referred to as the inner peripheral side, and the opposite side thereof is referred to as the outer peripheral side. In the electrode assembly 14, the longitudinal direction of the positive electrode 11 and the negative electrode 12 becomes a winding direction, and the width direction of the positive electrode 11 and the negative electrode 12 becomes an axial direction. The positive electrode lead 19 extends, on the upper end of the electrode assembly 14, toward the axial direction from a substantial center between the center and the outermost circumference in the radial direction. The negative electrode lead 20 extends, on the lower end of the electrode assembly 14, toward the axial direction from near the winding axis 28.

For the separator 13, a porous sheet having an ion permeation property and an insulation property is used. Specific examples of the porous sheet include a fine porous thin film, a woven fabric, and a nonwoven fabric. As a material of the separator 13, an olefin resin such as polyethylene and polypropylene is preferable. A thickness of the separator 13 is, for example, greater than or equal to 10 μm and less than or equal to 50 μm. The separator 13 has tended to be thinned as higher capacity and higher output of the battery. The separator 13 has a melting point of, for example, approximately greater than or equal to 130° C. and less than or equal to 180° C.

Figure 3:
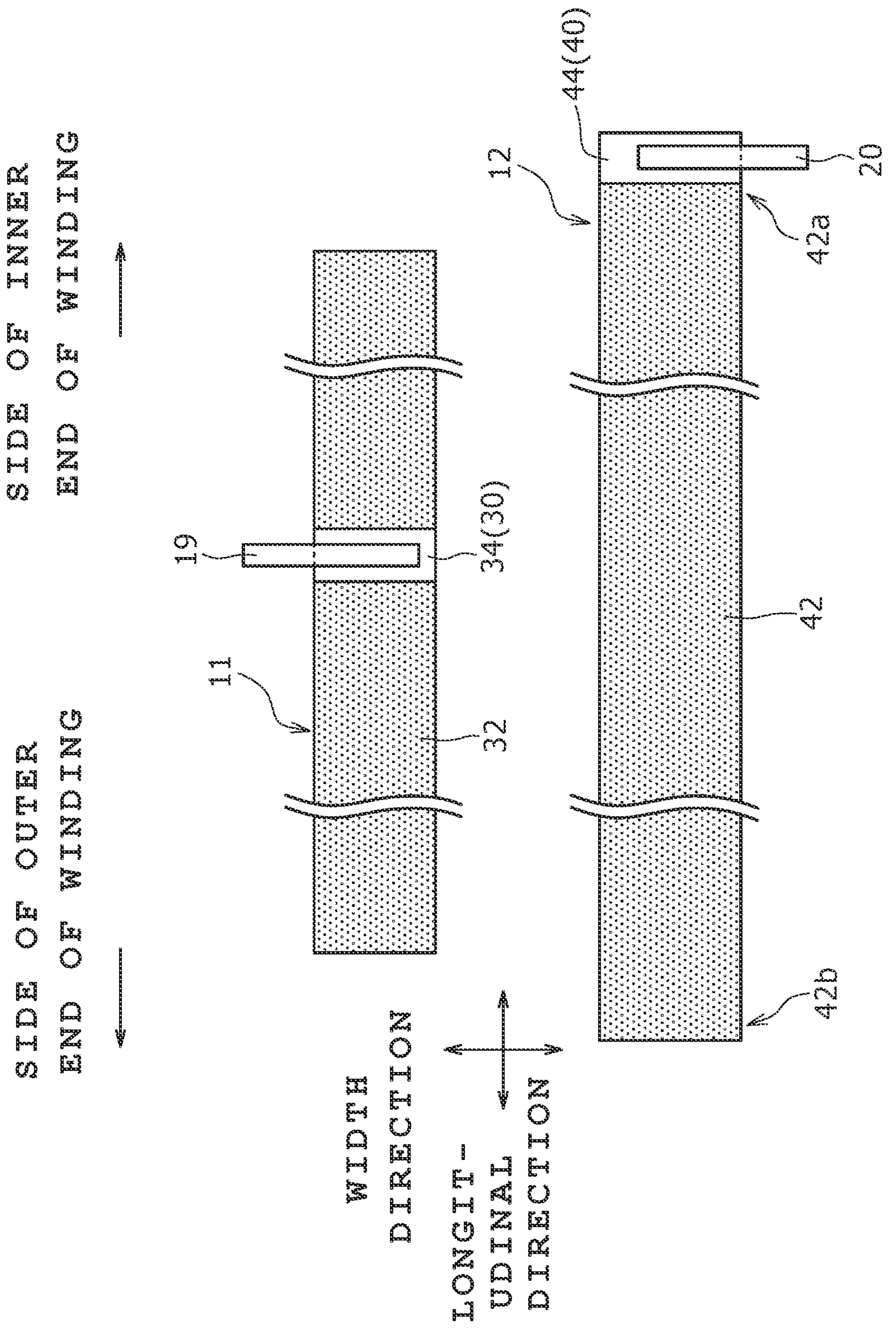
FIG. 3 is a front view of a positive electrode and a negative electrode that constitute an electrode assembly of an example of an embodiment with an unwound state.

Next, the positive electrode and the negative electrode according to the present embodiment will be described with reference to FIG. 3 and FIGS. 4(*a*) to 4(*d*). FIG. 3 is a front view of the positive electrode 11 and the negative electrode 12 constituting the electrode assembly 14. FIG. 3 illustrates the positive electrode 11 and the negative electrode 12 in an unwound state. As exemplified in FIG. 3, the negative electrode 12 is formed to be larger than the positive electrode 11 to prevent precipitation of lithium on the negative electrode 12 in the electrode assembly 14. In specific, a length of the negative electrode 12 in the direction (axial direction) is larger than a length of the positive electrode 11 in the width direction. In addition, a length the negative electrode 12 in the longitudinal direction is larger than a length of the positive electrode 11 in the longitudinal direction. As a result, at least a portion on which a positive electrode mixture layer 32 of the positive electrode 11 is formed is disposed opposite to a portion on which a negative electrode mixture layer 42 of the negative electrode 12 is formed with the separator 13 interposed therebetween when wound as the electrode assembly 14.

The positive electrode 11 has a band-shaped positive electrode current collector 30 and the positive electrode mixture layer 32 formed on a surface of the positive electrode current collector 30. The positive electrode mixture layer 32 is formed on at least one of the inner peripheral side and outer peripheral side of the positive electrode current collector 30, and preferably formed on an entire region of both surfaces of the positive electrode current collector 30 except for a positive electrode exposed portion 34, described later. For the positive electrode current collector 30, a foil of a metal such as aluminum, a film in which such a metal is disposed on a surface layer thereof, and the like are used, for example. A thickness of the positive electrode current collector 30 is, for example, greater than or equal to 10 μm and less than or equal to 30 μm.

The positive electrode mixture layer 32 preferably includes a positive electrode active material, a conductive agent, and a binder. The positive electrode mixture layer 32 may be produced by, for example, applying a positive electrode mixture slurry including the positive electrode active material, the conductive agent, the binder, and a solvent such as N-methyl-2-pyrrolidone (NMP) on both the surfaces of the positive electrode current collector 30, and drying and then rolling.

On the positive electrode 11, the positive electrode exposed portion 34 where a surface of the positive electrode current collector 30 is exposed is provided. The positive electrode exposed portion 34 is a portion to which the positive electrode lead 19 is connected and a portion where a surface of the positive electrode current collector 30 is uncovered with the positive electrode mixture layer 32. The positive electrode exposed portion 34 is more widely formed than the positive electrode lead 19 in the longitudinal direction. The positive electrode exposed portion 34 is preferably provided on both surfaces of the positive electrode 11 so as to be stacked in the thickness direction of the positive electrode 11. The positive electrode lead 19 is bonded to the positive electrode exposed portion 34 with, for example, ultrasonic welding.

In the example illustrated in FIG. 3, the positive electrode exposed portion 34 is provided on a center of the positive electrode 11 in the longitudinal direction and over an entire length in the width direction. Although the positive electrode exposed portion 34 may be formed on the inner end of winding or outer end of winding of the positive electrode 11, the positive electrode exposed portion 34 is preferably provided at a position of substantially same distance from the inner end of winding and the outer end of winding from a viewpoint of current collectability. The positive electrode lead 19 connected to the positive electrode exposed portion 34 provided at such a position allows the positive electrode lead 19 to be disposed to project upward from the end surface in the width direction at the substantial center in the radial direction of the electrode assembly 14 when wounded as the electrode assembly 14. The positive electrode exposed portion 34 is provided by, for example, intermittent application in which the positive electrode mixture slurry is not applied on a part of the positive electrode current collector 30.

Examples of the positive electrode active material included in the positive electrode mixture layer 32 include a lithium-transition metal oxide containing transition metal elements such as Co, Mn, and Ni. The lithium-transition metal oxide is, for example, $Li_xCoO_2$, $Li_xNiO_2$, $Li_xMnO_2$, $Li_xCo_yNi_{1-y}O_2$, $Li_xCo_yM_{1-y}O_z$, $Li_xNi_{1-y}M_yO_z$, $Li_xMn_2O_4$, $Li_xMn_{2-y}M_yO_4$, $LiMPO_4$, or $Li_2MPO_4F$, wherein M represents at least one of Na, Mg, Sc, Y, Mn, Fe, Co, Ni, Cu, Zn, Al, Cr, Pb, Sb, and B, $0<x\leq 1.2$, $0<y\leq 0.9$, and $2.0\leq z\leq 2.3$. These may be used singly, or a plurality of kinds thereof may be mixed to use. In terms of attempting a higher capacity of the non-aqueous electrolyte secondary battery, the positive electrode active material preferably includes a lithium-nickel composite oxide such as $Li_xNiO_2$, $Li_xCo_yNi_{1-y}O_2$, and $Li_xNi_{1-y}M_yO_z$, wherein M represents at least one of Na, Mg, Sc, Y, Mn, Fe, Co, Ni, Cu, Zn, Al, Cr, Pb, Sb, and B, $0<x\leq 1.2$, $0<y\leq 0.9$, and $2.0\leq z\leq 2.3$.

Examples of the conductive agent included in the positive electrode mixture layer 32 include carbon particles such as carbon black (CB), acetylene black (AB), Ketjenblack, carbon nanotube (CNT), graphene, and graphite. These may be used singly, or a plurality of kinds thereof may be mixed to use.

Examples of the binder included in the positive electrode mixture layer 32 include fluororesins such as polytetrafluoroethylene (PTFE) and polyvinylidene fluoride (PVdF), polyacrylonitrile (PAN), a polyimide resin, an acrylic resin, and a polyolefin resin. These may be used singly, or a plurality of kinds thereof may be mixed to use. When the positive electrode mixture slurry is prepared in an aqueous solvent, styrene-butadiene rubber (SBR), nitrile rubber (NBR), CMC or a salt thereof, polyacrylic acid or a salt thereof, polyvinyl alcohol, and the like may be used.

The negative electrode 12 has a band-shaped negative electrode current collector 40 and the negative electrode mixture layer 42 formed on a surface of the negative electrode current collector 40. The negative electrode mixture layer 42 is formed on at least one of the inner peripheral side and outer peripheral side of the negative electrode current collector 40, and preferably formed on an entire region of both surfaces of the negative electrode current collector 40 except for a negative electrode exposed portion 44, described later. For the negative electrode current collector 40, a foil of a metal such as copper, a film in which such a metal is disposed on a surface layer thereof, and the like are used, for example. A thickness of the negative electrode current collector 40 is, for example, greater than or equal to 5 μm and less than or equal to 30 μm.

The negative electrode mixture layer 42 includes a negative electrode active material and a solid electrolyte. The negative electrode mixture layer 42 may further include a binder. The negative electrode mixture layer 42 may be produced by, for example, applying a negative electrode mixture slurry including the negative electrode active material, the solid electrolyte, the binder, and a solvent such as water on both the surfaces of the negative electrode current collector 40, and drying and then rolling.

In the example illustrated in FIG. 3, the negative electrode exposed portion 44 is provided on an inner end of winding in the longitudinal direction of the negative electrode 12 and over an entire length in the width direction of the current collector. The negative electrode exposed portion 44 is a portion to which the negative electrode lead 20 is connected and a portion where a surface of the negative electrode current collector 40 is uncovered with the negative electrode mixture layer 42. The negative electrode exposed portion 44 is more widely formed than a width of the negative electrode lead 20 in the longitudinal direction. The negative electrode exposed portion 44 is preferably provided on both surfaces of the negative electrode 12 so as to be stacked in the thickness direction of the negative electrode 12.

In FIG. 3, an inner end of winding **42*a* of the negative electrode mixture layer 42 is a portion adjacent to the negative electrode exposed portion 44. Meanwhile, an outer end of winding 42*b* of the negative electrode mixture layer 42 is identical to the outer end of winding of the negative electrode 12. The negative electrode mixture layer 42 is continuously present from the inner end of winding 42*a* to the outer end of winding 42*b***.

In the present embodiment, the negative electrode lead 20 is bonded to a surface on the inner peripheral side of the negative electrode current collector 40 by, for example, ultrasonic welding. One end of the negative electrode lead 20 is disposed on the negative electrode exposed portion 44, and the other end extends downward from a lower end of the negative electrode exposed portion 44.

The position of the negative electrode lead 20 to be disposed is not limited to the example illustrated in FIG. 3, and the negative electrode lead 20 may be provided only on the outer end of winding of the negative electrode 12. The negative electrode lead 20 may also be provided on the inner end of winding and outer end of winding of the negative electrode 12. In this case, the current collectability is improved. Contacting the negative electrode exposed portion 44 in the outer end of winding of the negative electrode 12 with the inner peripheral surface of the exterior 15 (see FIG. 1) may electrically connect the outer end of winding with the exterior 15 without the negative electrode lead 20 on the outer end of winding of the negative electrode 12. The negative electrode exposed portion 44 is provided by, for example, intermittent application in which the negative electrode mixture slurry is not applied on a part of the negative electrode current collector 40.

The negative electrode active material included in the negative electrode mixture layer 42 is not particularly limited as long as it may reversibly occlude and release lithium ions. For example, carbon-based material such as natural graphite and artificial graphite, metals that form an alloy with lithium, such as Si and Sn, an alloy and oxide including these materials, or the like may be used.

The negative electrode active material may include the carbon-based material and a silicon-based material. Examples of the silicon-based material include Si, an alloy including Si, and silicon oxide such as $SiO_x$ (x represents 0.8 to 1.6). The silicon-based material is a negative electrode active material that may more increase the battery capacity than the carbon-based material. A content rate of the silicon-based material in the negative electrode active material is preferably greater than or equal to 3 mass % relative to a mass of the negative electrode active material from the viewpoints of increasing the battery capacity, inhibiting deterioration in the charge-discharge cycle characteristic, and the like. An upper limit of the content rate of the silicon-based material is, for example, 20 mass %. An average particle diameter (D50, a median diameter on a volumetric basis) of the carbon-based material is, for example, greater than or equal to 5 μm and less than or equal to 40 μm. D50 of the silicon-based material is, for example, greater than or equal to 1 μm and less than or equal to 15 μm. The D50 means a particle diameter at which a cumulative frequency is 50% from a smaller particle diameter side in a particle size distribution on a volumetric basis and also referred to as medium diameter. The particle size distribution of the carbon-based material and silicon-based material may be measured by using a laser diffraction-type particle size distribution measuring device (for example, MT3000II, manufactured by MicrotracBEL Corp.) with water as a dispersion medium.

The solid electrolyte included in the negative electrode mixture layer 42 is not particularly limited as long as it has Li-ion conductivity, and may be an inorganic solid electrolyte or a polymer solid electrolyte. Examples of the inorganic solid electrolyte include $Li_7La_3Zr_2O_2$ (LLZ), $Li_{1.5}Al_{0.5}Ge_{1.5}P_3O_{12}$ (LAGP), and $LisLa_3Ta_2O_2$ (LLTO). Examples of the polymer solid electrolyte include a polymer electrolyte in which polyethylene oxide (PEO) contains an electrolyte salt such as $LiPF_6$.

The solid electrolyte is preferably the inorganic solid electrolyte from the viewpoints of safety and the like. An average particle diameter (D50, a median diameter on a volumetric basis) of the inorganic solid electrolyte is, for example, greater than or equal to 0.01 μm and less than or equal to 10 μm.

A content rate of the solid electrolyte in the negative electrode mixture layer 42 is, for example, greater than or equal to 1 mass % and less than or equal to 10 mass %. Here, the content rate of the solid electrolyte is a percentage of a mass of the solid electrolyte relative to the mass of the negative electrode active material. As described later, the content rate of the solid electrolyte changes in the longitudinal direction of the negative electrode mixture layer 42.

Examples of the binder included in the negative electrode mixture layer 42 include styrene-butadiene rubber (SBR), nitrile-butadiene rubber (NBR), carboxymethylcellulose (CMC) or a salt thereof, polyacrylic acid (PAA) or a salt thereof (which may be PAA-Na, PAA-K, and the like, or a partially neutralized salt), and polyvinyl alcohol (PVA). The binder may include fluororesins such as polytetrafluoroethylene (PTFE) and polyvinylidene fluoride (PVdF), polyacrylonitrile (PAN), a polyimide resin, an acrylic resin, and a polyolefin resin. These materials may be used singly, or a plurality of kinds thereof may be mixed to use.

Next, the change in the content rate of the solid electrolyte included in the negative electrode mixture layer 42 in the longitudinal direction of FIG. 3 will be described with reference to FIGS. 4(*a*) to 4(*d*). In FIG. 4(*a*), the content rate of the solid electrolyte in the inner end of winding 42*a* is higher than the content rate of the solid electrolyte in the outer end of winding 42*b*, and the content rate of the solid electrolyte decreases at a certain rate from the inner end of winding 42*a* to the outer end of winding 42*b*. When the electrode assembly 14 expands and contracts with charge and discharge of the battery, the electrolyte liquid is less likely to permeate in the inner end of winding 42*a* than the outer end of winding 42*b* because a large stress is applied to the inner end of winding 42*a* compared with the outer end of winding 42*b*. Setting the content rate of the solid electrolyte in the inner end of winding 42*a* to be higher than the content rate of the solid electrolyte in the outer end of winding 42*b* may inhibit ununiform reaction between the inner end of winding 42*a* and the outer end of winding 42*b* with charge and discharge of the battery, and thus the charge-discharge cycle characteristics of the battery may be improved. The effect of the present disclosure is remarkable with high-rate charge and discharge because such charge and discharge are likely to generate ununiform electrolyte liquid between the inner end of winding 42*a* and the outer end of winding 42*b*.

The content rate of the solid electrolyte in the inner end of winding 42*a* is preferably greater than or equal to 1 mass % and less than or equal to 15 mass % relative to the mass of the negative electrode active material. This may improve the charge-discharge cycle characteristics of the battery with keeping the battery capacity.

As shown in FIG. 4(*b*), the gradient indicating the decreasing rate of the content rate of the solid electrolyte from the inner end of winding 42*a* to the outer end of winding 42*b* may not be constant, and the gradient may change in the middle. In FIG. 4(*c*), the content rate of the solid electrolyte decreases from the inner end of winding 42*a* to the outer end of winding 42*b*, and the content rate of the solid electrolyte is constant between the inner end of winding 42*a* and the outer end of winding 42*b*. In FIG. 4(*d*), the content rate of the solid electrolyte decreases from the inner end of winding 42*a* to the outer end of winding 42*b*, and the content rate of the solid electrolyte is constant near the outer end of winding 42*b*. Similarly, as long as the content rate of the solid electrolyte decreases from the inner end of winding 42*a* and the outer end of winding 42*b*, the content rate of the solid electrolyte may be constant near the inner end of winding 42*a*. As indicated in FIGS. 4(*c*) and 4(*d*), provided is a region where the content rate of the solid electrolyte continuously decreases from the inner end of winding 42*a* side to the outer end of winding 42*b* side in at least a part of the negative electrode mixture layer 42. In this region, the content rate of the solid electrolyte preferably decreases linearly, but may decrease non-linearly. This may set the content rate of the solid electrolyte in the inner end of winding 42*a* of the negative electrode mixture layer 42 to be higher than the content rate of the solid electrolyte in the outer end of winding 42*b*.

Next, described is a method for forming the negative electrode mixture layer 42 in which the content rate of the solid electrolyte changes from one side to the other side of the inner end of winding 42*a* side and the outer end of winding 42*b* side. To form such a negative electrode mixture layer 42, a multilayer die coater is preferably used. Using the multilayer die coater may simultaneously apply a plurality of negative electrode mixture slurries having different content rates of the solid electrolyte on the negative electrode current collector 40 with regulating a mixing ratio thereof. When the negative electrode mixture slurry is applied on the negative electrode current collector 40, the negative electrode current collector 40 moves relative to the multilayer die coater. Thus, applying the plurality of the negative electrode mixture slurries having different content rates of the solid electrolyte on the negative electrode current collector 40 with changing the mixing ratio thereof at a predetermined timing may form the region where the content rate of the solid electrolyte changes from the inner end of winding 42*a* side to the outer end of winding 42*b* side at any position in the negative electrode mixture layer 42. For example, prepared are: a first negative electrode mixture slurry containing the solid electrolyte; and a second negative electrode mixture slurry having a content rate of the solid electrolyte being lower than that in the first negative electrode mixture slurry. Then, using the multilayer die coater, the first and second negative electrode mixture slurries are applied from the inner end of winding 42*a* to the outer end of winding 42*b* of the negative electrode current collector 40 with increasing the mixing ratio of the second negative electrode mixture slurry to the first negative electrode mixture slurry to obtain the negative electrode mixture layer 42 having the profile illustrated in FIG. 4(*a*).

Note that, like the positive electrode 11 illustrated in FIG. 3, even when the negative electrode mixture layer 42 of the negative electrode 12 is separated into two or more portions with the exposed portion, the content rate of the solid electrolyte in the inner end of winding 42*a* is higher than the content rate of the solid electrolyte in the outer end of winding 42*b*. The region where the content rate of the solid electrolyte decreases from the inner end of winding 42*a* side to the outer end of winding 42*b* side is preferably formed in at least a part of the negative electrode mixture layer 42 continued from the inner end of winding 42*a*.

EXAMPLES

Hereinafter, the present disclosure will be further described with Examples, but the present disclosure is not limited to these Examples.

[Production of Positive Electrode]

Mixing 95 parts by mass of $LiNi_{0.8}Co_{0.15}Al_{0.05}O_2$, 2.5 parts by mass of acetylene black (AB), and 2.5 parts by mass of polyvinylidene fluoride (PVdF) having an average molecular weight of 1.1 million was performed, and an appropriate amount of N-methyl-2-pyrrolidone (NMP) was added to prepare a positive electrode mixture slurry with a solid content of 70 mass %. Then, this positive electrode mixture slurry was applied on both surfaces of a band-shaped positive electrode current collector made of aluminum foil, the coating was dried and then rolled, and cut to a predetermined electrode size to produce a positive electrode in which positive electrode mixture layers were formed on both the surfaces of the positive electrode current collector. A positive electrode exposed portion where the mixture layer was absent and the current collector surface was exposed was provided at the substantially center in a longitudinal direction of the positive electrode. A positive electrode lead made of aluminum was welded with the positive electrode exposed portion.

[Production of Negative Electrode]

As a negative electrode active material, graphite having an average particle diameter (D50) of 20 μm and SiO having D50 of 5 μm were used. As a solid electrolyte, $Li_7La_3Zr_2O_{12}$ (LLZ) having D50 of 1 μm was used. Mixing 95 parts by mass of the graphite, 5 parts by mass of the SiO, 10 part by mass of the LLZ, 1 part by mass of carboxymethylcellulose (CMC), and 1 part by mass of styrene-butadiene rubber (SBR) was performed, and an appropriate amount of water was added to prepare a first negative electrode mixture slurry. Mixing 95 parts by mass of the graphite, 5 parts by mass of the SiO, 1 part by mass of the CMC, and 1 part by mass of the SBR was performed, and an appropriate amount of water was added to prepare a second negative electrode mixture slurry. Then, the first negative electrode mixture slurry and the second negative electrode mixture slurry were set to a multilayer die coater, the first negative electrode mixture slurry and the second negative electrode mixture slurry were applied on both surfaces of a band-shaped negative electrode current collector made of copper foil similarly from an inner end of winding to an outer end of winding with continuously changing a mixing ratio therebetween from 1:0 to 0:1, and then the coating was dried. The dried coating was rolled by using a roller, and then cut to a predetermined electrode size to produce a negative electrode in which negative electrode mixture layers were formed on both the surfaces of the negative electrode current collector. A negative electrode exposed portion where the mixture layer was absent and the current collector surface was exposed was provided in the inner end of winding. A negative electrode lead made of nickel was welded with the negative electrode exposed portion.

[Preparation of Electrolyte]

Into 100 parts by mass of a mixed solvent composed of ethylene carbonate (EC) and dimethyl carbonate (DMC) (EC:DMC=1:3 at a volume ratio), 5 parts by mass of vinylene carbonate (VC) was added. Into this mixed solvent, $LiPF_6$ was dissolved so that the concentration was 1 mol/L to prepare an electrolyte.

[Production of Secondary Battery]

The above positive electrode and the above negative electrode were wound with a separator made of polyethylene interposed therebetween to produce an electrode assembly. Insulating plates were disposed on upper and lower sides of the electrode assembly respectively, and the electrode assembly was housed in a cylindrical exterior. Then, a negative electrode lead was welded with a bottom of the exterior, and a positive electrode lead was welded with a sealing assembly. Thereafter, the electrolyte was injected inside the exterior by a pressure reducing method, and then an opening end of the exterior was sealed to be caulked to the sealing assembly with a gasket interposed therebetween to produce a secondary battery. A capacity of the produced secondary battery was 2500 mAh.

Example 2

A secondary battery was produced in the same manner as in Example 1 except that, in the production of the negative electrode, the amount of LLZ included in the first negative electrode mixture slurry was 6 parts by mass.

Example 3

A secondary battery was produced in the same manner as in Example 1 except that, in the production of the negative electrode, the amount of LLZ included in the first negative electrode mixture slurry was 14 parts by mass.

Example 4

A secondary battery was produced in the same manner as in Example 1 except that, in the production of the negative electrode, the amount of the LLZ included in the first negative electrode mixture slurry was 18 parts by mass.

Comparative Example 1

A secondary battery was produced in the same manner as in Example 1 except that, in the production of the negative electrode, the first negative electrode mixture slurry and the second negative electrode mixture slurry were not mixed and only the second negative electrode mixture slurry was applied on both the surfaces of the negative electrode current collector.

Comparative Example 2

A secondary battery was produced in the same manner as in Example 1 except that, in the production of the negative electrode: mixing 95 parts by mass of the graphite, 5 parts by mass of the SiO, 5 parts by mass of the LLZ, 1 part by mass of the CMC, and 1 part by mass of the SBR was performed, and an appropriate amount of water was added to prepare a third negative electrode mixture slurry; and only the third negative electrode mixture slurry was applied on both the surfaces of the negative electrode current collector.

Comparative Example 3

A secondary battery was produced in the same manner as in Example 1 except that, in the production of the negative electrode, the first negative electrode mixture slurry and the second negative electrode mixture slurry were applied from the inner end of winding to the outer end of winding of the negative electrode current collector with continuously changing the mixing ratio therebetween from 0:1 to 1:0.

Comparative Example 4

A secondary battery was produced in the same manner as in Comparative Example 2 except that, in the production of the negative electrode, the amount of LLZ included in the third negative electrode mixture slurry was 3 parts by mass.

Comparative Example 5

A secondary battery was produced in the same manner as in Comparative Example 2 except that, in the production of the negative electrode, the amount of the LLZ included in the third negative electrode mixture slurry was 7 part by mass.

Comparative Example 6

A secondary battery was produced in the same manner as in Comparative Example 2 except that, in the production of the negative electrode, the amount of the LLZ included in the third negative electrode mixture slurry was 9 parts by mass.

[Evaluation of Capacity Maintenance Rate]

Under an environment temperature at 25° C., the non-aqueous electrolyte secondary battery of Examples and Comparative Examples was charged at a constant current of 1 C until 4.2 V, and then charged at a constant voltage of 4.2 V until a current value reached 0.05 C. After the non-aqueous electrolyte secondary battery was left to stand for 20 minutes, the battery was discharged at a constant current of 0.5 C until 2.5 V. This charge and discharge was specified as one cycle, and 300 cycles were performed. A capacity maintenance rate in the charge-discharge cycle of the non-aqueous electrolyte secondary battery of each Example and each Comparative Example was determined by the following formula.

$$\text{Capacity Maintenance Rate} = (\text{Discharge Capacity at 300th Cycle}/\text{Discharge Capacity at 1st Cycle}) \times 100$$

Table 1 summarizes the evaluation results of the capacity maintenance rates of the non-aqueous electrolyte secondary batteries of the Examples and Comparative Examples. Table 1 also shows: the content rates of the solid electrolyte in the inner end of winding and the outer end of winding; and the content rate of the solid electrolyte in the negative electrode mixture layer (average content rate in an entirety of the negative electrode mixture layer).

TABLE 1

| | Content rate of solid electrolyte [mass %] | | | Capacity |
|---|---|---|---|---|
| | Inner end of winding | Outer end of winding | Entirety | maintenance rate [%] |
| Example 1 | 10 | 0 | 5 | 85 |
| Example 2 | 6 | 0 | 3 | 82 |
| Example 3 | 14 | 0 | 7 | 85 |
| Example 4 | 18 | 0 | 9 | 84 |
| Comparative Example 1 | 0 | 0 | 0 | 70 |
| Comparative Example 2 | 5 | 5 | 5 | 78 |
| Comparative Example 3 | 0 | 10 | 5 | 73 |
| Comparative Example 4 | 3 | 3 | 3 | 72 |
| Comparative Example 5 | 7 | 7 | 7 | 73 |
| Comparative Example 6 | 9 | 9 | 9 | 70 |

The batteries of Examples have an improved capacity maintenance rate compared with the battery of Comparative Example 1, which includes no solid electrolyte. The batteries of Examples have an improved capacity maintenance rate compared with the batteries of Comparative Example 2 and Comparative Examples 4 to 6, which entirely and uniformly include the solid electrolyte in the negative electrode mixture layer. Furthermore, the batteries of Examples have an improved capacity maintenance rate compared with the battery of Comparative Example 3, which has a higher content rate of the solid electrolyte in the outer end of winding of the negative electrode mixture layer. As above, it is found from the results shown in Table 1 that the specific method of disposing the solid electrolyte remarkably exhibits the effect of improving the capacity maintenance rate.

REFERENCE SINGS LIST

10 Secondary battery, 11 Positive electrode, 12 Negative electrode, 13 Separator, 14 Electrode assembly, 15 Exterior, 16 Sealing assembly, 17, 18 Insulating plate, 19 Positive electrode lead, 20 Negative electrode lead, 21 Grooved portion, 22 Filter, 23 Lower vent member,

24 Insulating member, 25 Upper vent member, 26 Cap, 26*a* Opening, 27 Gasket, 28 Winding axis, 30 Positive electrode current collector, 32 Positive electrode mixture layer, 34 Positive electrode exposed portion, 40 Negative electrode current collector, 42 Negative electrode mixture layer, 42*a* Inner end of winding, 42*b* Outer end of winding, 44 Negative electrode exposed portion

The invention claimed is:

1. A non-aqueous electrolyte secondary battery, comprising: an electrode assembly in which a band-shaped positive electrode and a band-shaped negative electrode are wound with a separator interposed there between; an electrolyte liquid; and an exterior housing the electrode assembly and the electrolyte liquid, wherein the negative electrode has: a negative electrode current collector; and a negative electrode mixture layer formed on a surface of the negative electrode current collector and including a negative electrode active material and a solid electrolyte, the separator is formed from a porous sheet having an ion permeation property, and in the negative electrode mixture layer, a content rate of the solid electrolyte in an inner end of winding is higher than a content rate of the solid electrolyte in an outer end of winding, and the negative electrode mixture layer on the same surface has a region where a content rate of the solid electrolyte continuously decreases from a side of the inner end of winding to a side of the outer end of winding.

2. The non-aqueous electrolyte secondary battery according to claim 1, wherein a content rate of the solid electrolyte in the negative electrode mixture layer is greater than or equal to 1 mass % and less than or equal to 10 mass %.

3. The non-aqueous electrolyte secondary battery according to claim 1, wherein the solid electrolyte is an inorganic solid electrolyte.

4. The non-aqueous electrolyte secondary battery according to claim 1, wherein the negative electrode active material includes a carbon-based material and a silicon-based material, and a content rate of the silicon-based material in the negative electrode active material is greater than or equal to 3 mass % relative to a mass of the negative electrode active material.

* * * * *